United States Patent [19]
Durham

[11] 3,747,391
[45] July 24, 1973

[54] CABLE BENDER
[76] Inventor: Henry B. Durham, 306 S. 23rd St., Birmingham, Ala. 35233
[22] Filed: Aug. 9, 1971
[21] Appl. No.: 170,071

[52] U.S. Cl. ............ 72/387, 72/298, 72/310, 72/407
[51] Int. Cl. .................................. B21d 11/00
[58] Field of Search .............. 72/298, 310, 387, 72/407, 457

[56] References Cited
UNITED STATES PATENTS
3,468,009  9/1969  Clausing ................ 113/118
347,488  8/1886  Hunsicker ................ 72/298

Primary Examiner—Lowell A. Larson
Attorney—C. A. Phillips

[57] ABSTRACT

A wire or cable bender which has two spaced counter-rotating bending heads attached to the adjacent ends of a pair of spaced shafts and including lever arms attached to the opposite ends of the shaft which are driven by a hydraulically powered piston.

4 Claims, 8 Drawing Figures

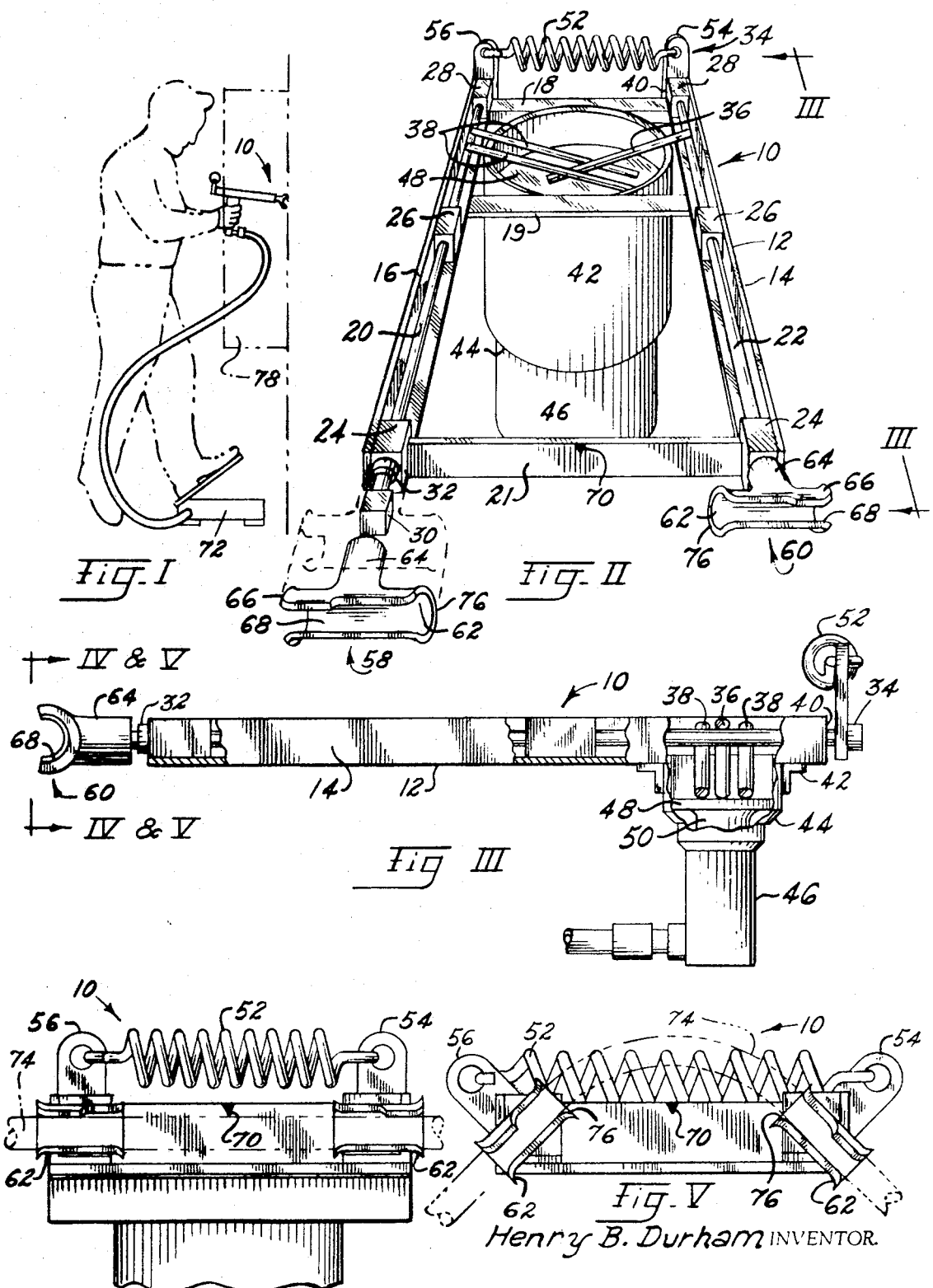

PATENTED JUL 24 1973 3,747,391
SHEET 2 OF 2
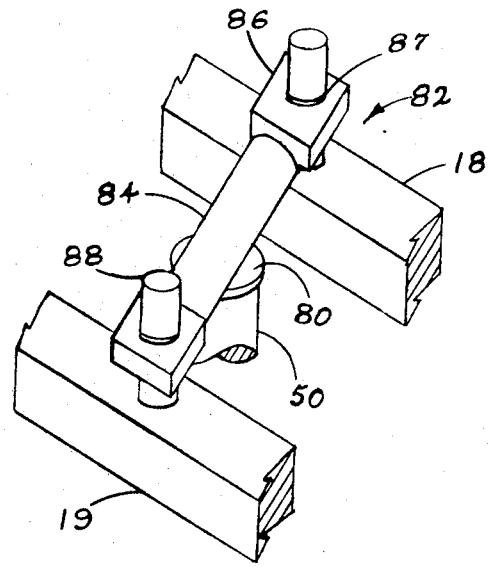
Fig VI
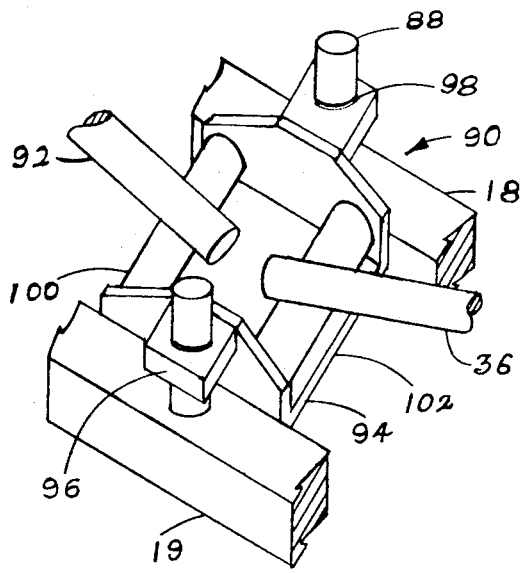
Fig VII
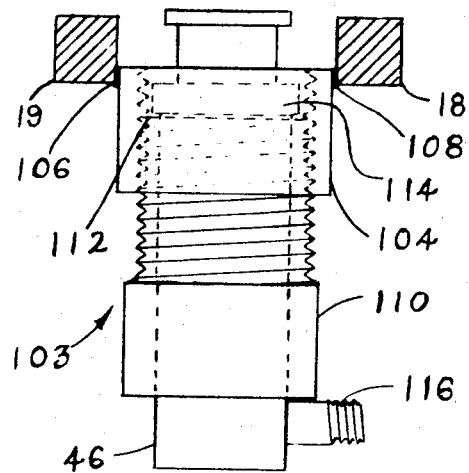
Fig VIII
Henry B. Durham INVENTOR
BY
C.A. Phillips ATTORNEY

CABLE BENDER

BACKGROUND OF THE INVENTION

1. Field of the Invention

This invention relates to cable or wire benders and more particularly to an improved such bender adapted for use in confined spaces.

2. Description of the Prior Art

The wiring of buildings, particularly those used for industrial and commercial purposes involves the use of quite large electrical cables. The installation of such cables requires considerable bending and forming and frequently this must be done within confined regions such as within switching and terminal housing and cable trays. Tools heretofore designed for the purpose of cable bending have generally not been adapted to bend cable within confined spaces and to make bends typically required for interconnection within such spaces. This has thus made it necessary to remove cable from an enclosure to form it making it more difficult to gauge the precise bends required and is time consuming. Further, in some instances such equipment totally encloses the cable making removal of the equipment difficult after a bend. Still further, existing current wire benders suffer the disadvantage that by virtue of the structural configurations, tremendous pressures are required to start a bend and thus one is generally unable to bend the very large cables, cables on the order of a million circular mills.

SUMMARY OF THE INVENTION

Accordingly, it is an object of this invention to provide a cable bender which is particularly adapted to perform bending operations within confined regions and without the necessity of first removing the cables.

It is a further object of this invention to provide a cable bender which requires minimum effort and minimum time by the operator to make an accurate bend.

These and other objects are accomplished in the present invention in which two parallel spaced shafts are mounted on a supporting frame. A bending shoe is attached to a common end of each of the shafts and the two shoes are adapted to grip the cable when positioned along a line normal to the shafts. A pair of crossed lever arms extend from the shafts at points near the opposite ends of the shafts. A linear force generator, such as a hydraulic cylinder, is mounted to the frame and its force arm engages the lever arms. As power is applied, the force arm extends, causing the shafts to rotate in opposite directions. With a cable positioned to be gripped by the bending shoes, this rotation of the shafts causes an equal and opposite bending force to be applied through the shoes to the cable.

BRIEF DESCRIPTION OF THE DRAWINGS

The invention will be more fully understood by the following description when considered together with the accompanying drawings in which FIG. 1 is an elevational view illustrating the use of the invention in a typical application.

FIG. 2 is a perspective view of an embodiment of the invention.

FIG. 3 is a side view, partially in a section, of the embodiment of the invention shown in FIG. 2.

FIG. 4 is an end view of an enlarged portion of the embodiment of the invention as shown along lines 4—4 of FIG. 3 and with the cable inserted for bending.

FIG. 5 is a partial end view of the embodiment of the invention shown in FIG. 4 following a bending operation.

FIG. 6 is a perspective view, partially in section, showing an alternate embodiment of a hydraulic piston coupler.

FIG. 7 is a perspective view, partially in section, of a second alternate embodiment of a hydraulic piston coupler.

FIG. 8 is a side view of an alternate mounting assembly for a hydraulic cylinder.

As shown in the drawings, particularly 2–5, cable bender 10 includes a frame 12 consisting of two elongated, angle iron, side member 14 and 16 which are held in position by crossbars 18, 19 and 21. Parallel spaced shafts 20 and 22 extend longitudinally along frame 12. Shafts 20 and 22 are each supported by three bearings, end bearing 24, intermediately positioned bearing 26 and end bearing 28. These bearings are in turn rigidly mounted on side members 14 and 16. Shafts 20 and 22 extend beyond the ends of bearings 24 and 28 and at one end, shafts 20 and 22 are formed into square shanks 30. Collars or enlarged regions 32 prevent end movement of shafts 20 and 22 in one axial direction and collars or enlarged regions 34 prevent end movement of shafts 20 and 22 in the opposite direction to thus confine shafts 20 and 22. Actuating or eccentric levers 36 and 38 are secured near end 40 of frame 12 to shafts 20 and 22, respectively. They extend at right angles to the shaft and are of a length just short of the distance between shafts and are positioned, as will be further explained, below a cross frame 12 so that lever 36 consisting of a single arm is enmeshed with lever 38. One end 42 of frame 44 of hydraulic cylinder 46 is rigidly mounted near end 40 of frame 12. It is so positioned that domed cap 48 attached to the end of piston 50 of cylinder 46 uniformly engages levers 36 and 38. Return spring 52 is attached by means of arms 54 and 56 to the upper portions of collars 34 and applies a torsional force to shafts 20 and 22 to cause levers 36 and 38 to apply a downward pressure on domed cap 48. This enables the reset of domed cap 48 and piston 50 to a non-extended position when hydraulic pressure is removed from cylinder 46. Removable bending heads 58 and 60 are attached to the square shanks 30 to shafts 20 and 22. Each bending head consists of a wire holding cradle or holding shoe 62 and mounting receptacle 64. Holding shoe 62 is generally tubular with a cable holding axis normal to the axis of receptacles and shafts 20 and 22 and includes a cable gripping finger 66 extending outward from the axis of the receptacle and is formed to leave a slot 68 of sufficient size to accept cable to be formed. The interior or remaining region of shoes 62 is essentially open to facilitate removal of the cable after each bending operation. Fingers 66 at a top side of one end region of each shoe apply a downward force to cable and the bottom side of the opposite end region of each shoe applies an upper force to the cable.

In operation, cable bender 10 is positioned with bending shoes 62 symmetrically positioned over the cable with the center 70 indexed to the center of the desired bend point on the cable. Hydraulic pump 72 is operated by the foot of the operator to apply fluid pressure to hydraulic cylinder 46 which in turn forces piston 50 and domed cap 48 upward applying force to levers 36 and 38. This causes counter-rotation of shafts 20 and 22 and bending heads 58 and 60. In this manner cable gripping fingers 66 apply equal and opposite bending forces with respect to cable 74 which is supported by cradles 62 and which by virtue of tapered edge region 70 enables a graduated application of force to the cable. Gripping fingers 66 on a top side of one end of each holding shoe 62 apply a downward force and a lower edge region 76 on a bottom side of the other edge of holding shoe 62 applies an upward force on a cable. When the desired bend angle has been completed, hydraulic pressure to cylinder 46 is released, by means not shown, and with a counter-rotational force applied by spring 52 bending heads 58 and 60 are relaxed with respect to cable 74 and thus tool bender 10 may be readily removed.

One alternate method of coupling hydraulic piston 50 to actuating levers 36 and 38 is shown in FIG. 6. Domed cap 48 is removed, exposing flat upper surface 80 of piston 50. An intermediate coupler 82 is formed from a short length of rod 84, secured between two pieces of metal bar 86. Apertures 87 in the bar are spaced to slide on vertical guide pins 88, centrally secured to crossbars 18 and 19. Intermediate coupler 82 is inserted between flat surface 80 of piston 50 and actuating levers 36 and 38.

A second alternate method for coupling piston 50 to actuating levers 36 and 38 is shown in FIG. 7. In order to use coupler 90, actuating levers 36 and 38 are modified as follows. Lever 36 is shortened so that it extends less than half the distance between shafts 20 and 22. The two arms of lever 38 are replaced by a single arm 92 which is mounted to shaft 20 in axial alignment with lever 36 and shortened so as to clear lever 36 as shafts 20 and 22 rotate. Piston coupler 90 is made as follows. A U-shaped bracket 94, configured to fit between crossbars 18 and 19, is secured between two metal bars 96 which extend over crossbars 18 and 19. Apertures 98 in the bar stock are dimensioned to slide on guide pins 88. Two spaced rods 100 are mounted in the bottom and near each edge of U bracket 94. In use, piston coupler 90 is inserted between piston 50 and actuating levers 36 and 92, so that bottom surface 102 of U bracket rests on flat surface 80 of piston 50 and actuating levers 36 and 92 are in contact with rods 100.

FIG. 8 shows an alternate mounting assembly 103 for hydraulic cylinder 46. A cylindrical threaded receptacle 104, which is secured to crossbars 18 and 19 at two points 106 and 108, is adapted to accept threaded tubular sleeve 110. The internal surface of tubular sleeve 110 is dimensioned to fit outer surface of hydraulic cylinder 46. Thus to install hydraulic cylinder 46, sleeve 110 is first removed from receptacle 104 and hydraulic fitting 116 is removed from cylinder 46. Then cylinder 46 is inserted through sleeve 110 so that shoulder 114, at top of cylinder 46 as shown, engages upper rim 112 of sleeve 110. When hydraulic fitting 116 is installed in cylinder 46, sleeve 110 may be threaded into receptacle 104 to any desired depth.

It will thus be seen that a bend may be made outboard of the end of cable bender with the cable bender positioned essentially at right angles with respect to this desired bend. Thus, as shown in FIG. 1 an operator may make a bend with the plane of the cable lying adjacent to the interior surface of an enclosure 78. The cable does not have to be fed through cable bender 10 and thus it may be rapidly positioned about the cable. By virtue of the geometry of the device the operator can readily position the cable to execute a bend at a desired point to achieve accurate bending. However, in the event of a mistake, a counter bend can be readily achieved by removing the bender from the cable, relocating the bending heads by 90°, turning the bender over and repositioning it on the cable. In this manner a counter bend may be made to return the cable to a corrected bend or to a straight position and thereafter a corrected bend made as described above.

Of course, where a bend is simply started in the wrong place and a slight bend is made, it is only necessary to release tension, move the cable to the correct position and continue the bend.

Bending heads 58 and 60 may be of various size to properly grip different size cables, either single conductor of multi-conductor cables may be bent and the cable may be gripped at different points to make long bends. In each instance cable bender 10 is quickly released from a particular bend so that one may proceed with the next bend. It is of simple construction, of light weight and may be conveniently powered by a simple foot or otherwise actuated hydraulic pump by one man. Equal force is applied by each bending head and thus symmetrical bends are readily achieved. There are no abrupt pressure points applied to a cable and thus the danger of damaging insulation is minimized. Finally, and as previously mentioned, the invention enables cables to be bent in place and thus eliminating the major difficulty with existing cable benders which cannot be used in many instances to perform bends within restricted space enclosures. These are features not present in other type cable benders.

What is claimed is:

1. A cable bender comprising:
   A. a frame member;
   B. first and second shafts supported in a parallel spaced relation upon said frame member;
   C. first cable bending head means adapted to attach to one end of said first shaft and second cable bending head means adapted to attach to an adjacent end of said second shaft, said cable bending head means each being adapted to grip a cable positioned perpendicular to the axis of a said shaft, and wherein each said bending head means comprises a tubular holder having open side regions for receiving a cable and opposite end regions adapted to apply force to opposite sides of said cable when said shafts and said head bending means are rotated in counter rotational directions;
   D. shaft rotation means supported by said frame and adapted to apply counter rotational forces to said shaft comprising:
      1. lever arm means comprising at least one lever arm attached to and disposed eccentrically with respect to each said shaft,
      2. jack means supported by said frame member for applying a force to said lever arms whereby said lever arms are rotated to rotate said shaft and said bending means in counter rotational directions;
      whereby cable positioned to be engaged by said cable bending head means is bent upon operation of said shaft rotation means.

2. A cable bender as set forth in claim 1 wherein each said bending head means and each end of a said shaft includes coupling means for readily connecting and disconnecting the bending head means from a said shaft.

3. A cable bender as set forth in claim 2 wherein each said bending head means is positionable upon said shafts in at least two angular positions with respect to a said shaft.

4. A cable bender as set forth in claim 2 further comprising spring means connected to said shafts for biasing said shafts with respect to said jack wherein said bending head means are positioned to accept a straight piece of cable.

* * * * *